United States Patent

[11] 3,552,722

[72] Inventor Fritz Sutter
    Pratteln, Switzerland
[21] Appl. No. 724,735
[22] Filed Apr. 29, 1968
[45] Patented Jan. 5, 1971
[73] Assignee Buss Aktiengesellschaft Basel
    Switzerland
    a corporation of Switzerland
[32] Priority Apr. 27, 1967
[33]   Switzerland
[31]   No. 6157/67
    Pat. 448—481

[54] CONTINUOUSLY OPERABLE MIXING AND KNEADING DEVICE
3 Claims, 1 Drawing Fig.

[52] U.S. Cl. .................................................. 259/21
[51] Int. Cl. .................................................. B01f 7/00
[50] Field of Search ........................................ 259/4, 6, 8, 9, 10, 18, 23, 24, 25, 26, 21, 97; 18/12SR, 12SH, 12SF

[56] References Cited
UNITED STATES PATENTS

| | | | |
|---|---|---|---|
| 656,674 | 8/1900 | Stebbins | 259/8(UX) |
| 2,660,937 | 12/1953 | Breeden | 259/9X |
| 2,692,124 | 10/1954 | Mendoza | 259/97 |
| 2,877,524 | 3/1959 | Bishop | 259/9X |
| 3,123,342 | 3/1964 | Little | 259/8X |
| 3,141,575 | 7/1964 | Brewer | 259/21X |
| 3,183,553 | 5/1965 | Slater | 259/9X |
| 3,206,171 | 9/1965 | Levake | 259/8 |
| 3,224,739 | 12/1965 | Schuur | 259/4 |
| 3,067,462 | 12/1962 | Kullgren | 18/12(SFUX) |
| 3,177,527 | 4/1965 | Nelson | 18/12(SH) |
| 2,568,332 | 9/1951 | Genovese | 18/12(SH) |

Primary Examiner—Robert W. Jenkins
Attorney—Abraham A. Saffitz

ABSTRACT: A continuously operating mixing and kneading apparatus for uniformly blending powdered plastics and cut pieces of calendered plastic sheet material comprising a first vertical casing with axial worm rotating on a shaft, a conical feed hopper projecting from the open end of the vertical casing and the shaft-carrying bar means at the top of the hopper and radially inclined blades between the bars and the worm, and additional feeding means constituting a horizontal casing, a second worm and a second feed hopper, the second worm rotating radially in respect to the first worm to uniformly and smoothly convey the proportions of materials delivered to it by the second worm while the rotational movement of the bars and the blades provides smooth and uniform feeding.

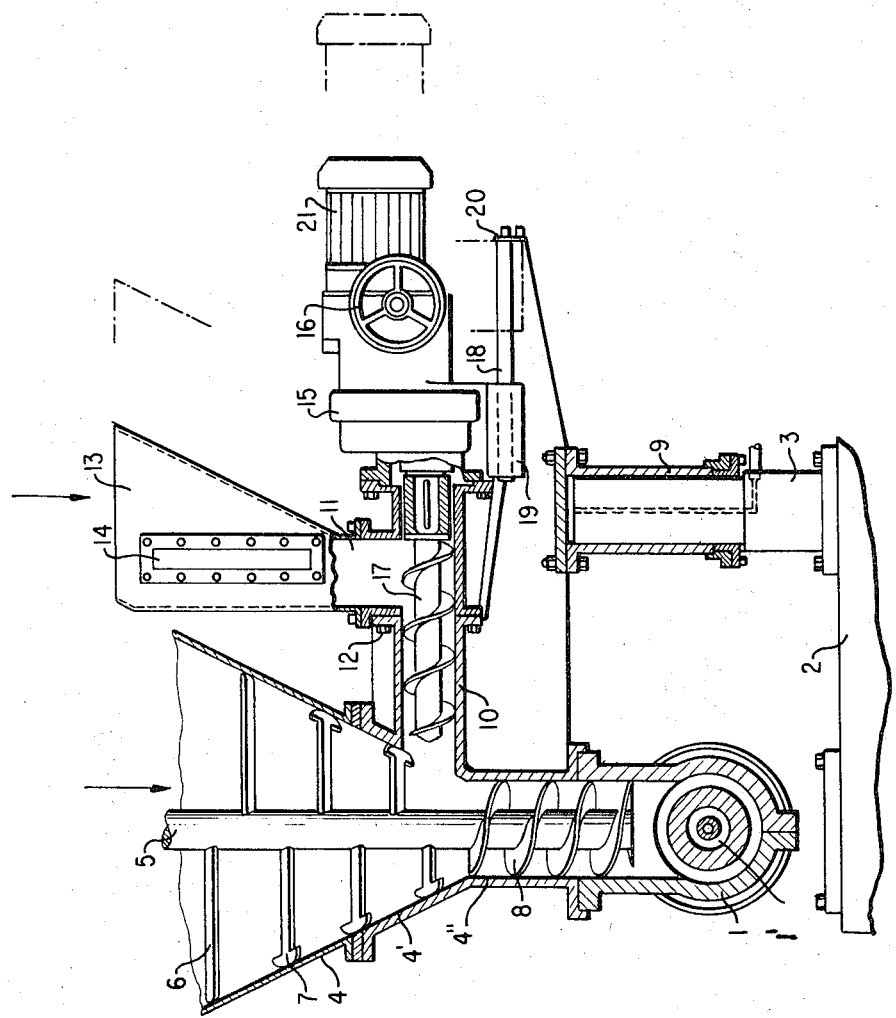

CONTINUOUSLY OPERABLE MIXING AND KNEADING DEVICE

This invention concerns a continuously operable mixing and kneading device which has a shaft rotating and oscillating simultaneously in a casing and having a feed hopper at one end wherein rotating blades and a feed worm are provided.

Among the materials which are to be mixed, kneaded and chemically combined are those having different characteristics, e.g. solids with solids, solids with liquids and/or gases. Devices for continuous mixing and kneading known at present have great disadvantages, if the material to be fed is composed of components having a very different physical nature, such as for example in respect to size of particles, specific gravity and shape, these show correspondingly different flow behavior and consequently have a high tendency to separate which causes unsteady and nonuniform conveyance in this known method.

The object of the invention is to eliminate these disadvantages. The mixing and kneading device proposed in accordance with the invention is characterized in that an additional feed device is attached to the feed hopper in the lower region thereof which has a worm running radially to the feed worm and whose casing is provided with a second feed hopper.

The continuously operable mixing and kneading device of the present invention may be advantageously employed, particularly in the production of sheets of plastics on a calender In this case, the kneader provides continuously homogenous heating, mixing and kneading of the material, which then according to requirement is only lightly sintered or plasticized, passed through nozzles into a suitable form, and is then continuously fed to the calender. On subsequent calendering a band of different width develops which is cut to size on both sides. With this arrangement, two relatively narrow strips of waste result which must be passed again through the process of production as rationally as possible. These strips are, as is known, cut into small pieces which are refed with the powdered plastics into the feed hopper of the kneading device. It has been proved in practice with conventional mixing and kneading devices that, due to the higher specific gravity of the pieces separation can take place so that after a short time, pieces or powder only are fed to the kneading device. These disadvantages do not arise in the proposed mixing and kneading device.

An embodiment of the subject matter of the invention is shown, by way of example only, partly in section in the accompanying drawing.

The mixing and kneading device shown has a cylindrical casing 1 wherein a shaft 1' having a worm is adapted to rotate and oscillate simultaneously. The casing 1 is secured on a support 2 and there is provided a feed hopper which consists of a longitudinally divided upper part 4 and a lower part 4'. The lower part 4' is provided with a cylindrical portion 4" which is connected to the feed aperture of the casing 1. A vertical shaft 5 is disposed in the upper hopper 4, 4', 4", which is carried in bearings (not shown) and driven by a separate drive.

The said vertical shaft 5 carried at the top simple horizontal bars 6 of rectangular shape. Radially inclined blades 7 are disposed therebelow whilst the shaft is also provided with a worm thread 8 in the region of the cylindrical portion 4" of the hopper.

A horizontal projection 10 is disposed on the part 4' of the hopper, which carries a feed casing 11. The two parts 10 and 11 form an additional feed device, which also has a feed worm 17 running horizontally. An electric motor 21 drives the worm 17 and is connected to the shaft of the latter via a gear 15. The speed of the gear may be adjusted by means of a hand wheel 16 or any other suitable control. The feed casing 11 further has a feed hopper 13 with an inspection glass 14 by means of which the content of the hopper can be controlled.

A support device 3 also rests on the support 2 and has a hydraulic lifting device 9 which is attached to the cylindrical part 4" of the hopper. A T-shaped slide ta track 18 is provided which is encircled by lugs 19 disposed on the gear casing.

To dismantle and clean the device, screws 12 between the flange of the horizontal projection 10 and the feed casing 11 are released so that the group consisting of the parts 11, 13, 15, 17 and 21 may be pushed to the right on the T-shaped slide track 18 up to a stop 20.

For cleaning and checking the casing and the worm 1' the whole unit is raised by means of the hydraulic lifting device 9 so that the hopper 4, 4', 4" together with the shaft 5 is accessible.

In operation the waste strips are cut continuously in a cutting machine and the small pieces are conveyed into the hopper 13 by a suitable device, for example a pneumatic conveyor. The operator watches the level of the bits constantly in the inspection glass and adjusts the speed of the worm shaft 17 accordingly. If the level is too high, then adjust an adjustment to a higher speed is made by means of the hand wheel 16, or vice versa. As, when operating with a calender, the waste strips do not have any great difference in width, the adjustment will not cause much work. It is however possible to make the adjustment automatic in that a sensor of the level is built into the hopper 13 which controls the adjustment of the hand wheel 16 and thereby the speed of the worm shaft 17. A coupling of the adjustment of the speed with the drive to the shaft 5 and of the subsequent kneader is also possible. Finally it may be required that the weight of the bits should be kept in exact proportion to the powder fed through the hopper 4. In this case each feed hopper could be filled via a weighing scale.

The utilization of the salvaged bits is only one of many possible uses of the proposed mixing and kneading device, as it is conceivable that one or more additional materials could have to be added to the material in the hopper 4, which for some reason or other have to be brought together in as short a time as possible before the manufacturing process. For this purpose several additional feed arrangements can be built onto part 4 of the hopper without any difficulty; the dosing may take place manually in that weighed portions are delivered chargewise to the hoppers or alternatively it can be made automatic. In this case each hopper has its individual dosing device and level sensor and a suitable safety device would slow down or stop all dosing devices if one of the drives to the shafts 5 and 17 should come up to maximum speed.

I claim:

1. A continuously operating mixing and kneading apparatus adapted for uniformly blending powdered plastics and cut pieces of plastic to continuously feed a calender, comprising:

a first cylindrical vertical casing having a worm disposed axially thereof on a shaft;

a first conical feed hopper projecting from an open end of said first casing through which said shaft extends along a longitudinal axis thereof;

said shaft carrying bar members at the top of said feed hopper and further carrying radially inclined blades at below said bars to assist in feeding the materials to be mixed to said worm which rotates; and an additional feeding means communicating at right angles with the base portion of said first conical feed hopper which brings a second stream of material into the upper part of said worm, said additional means including a horizontal casing, a second worm, a collar connecting said horizontal casing to said vertical casing with an opening in said collar providing communication between said vertical casing and said horizontal casing, and a second feed hopper, said second worm rotating radially in respect to said first worm of said first casing, whereby the movement of said first worm uniformly and smoothly conveys the proportions of materials delivered to it by said second worm while the rotational movement of said bars and said inclined blades on said first shaft assist smooth and uniform feeding.

2. An apparatus as claimed in claim 1, wherein said second feed hopper is provided with an inspection glass.

3. An apparatus as claimed in claim 1, wherein said second feed hopper is provided with sensing means to sense the level of material in said second hopper.